UNITED STATES PATENT OFFICE.

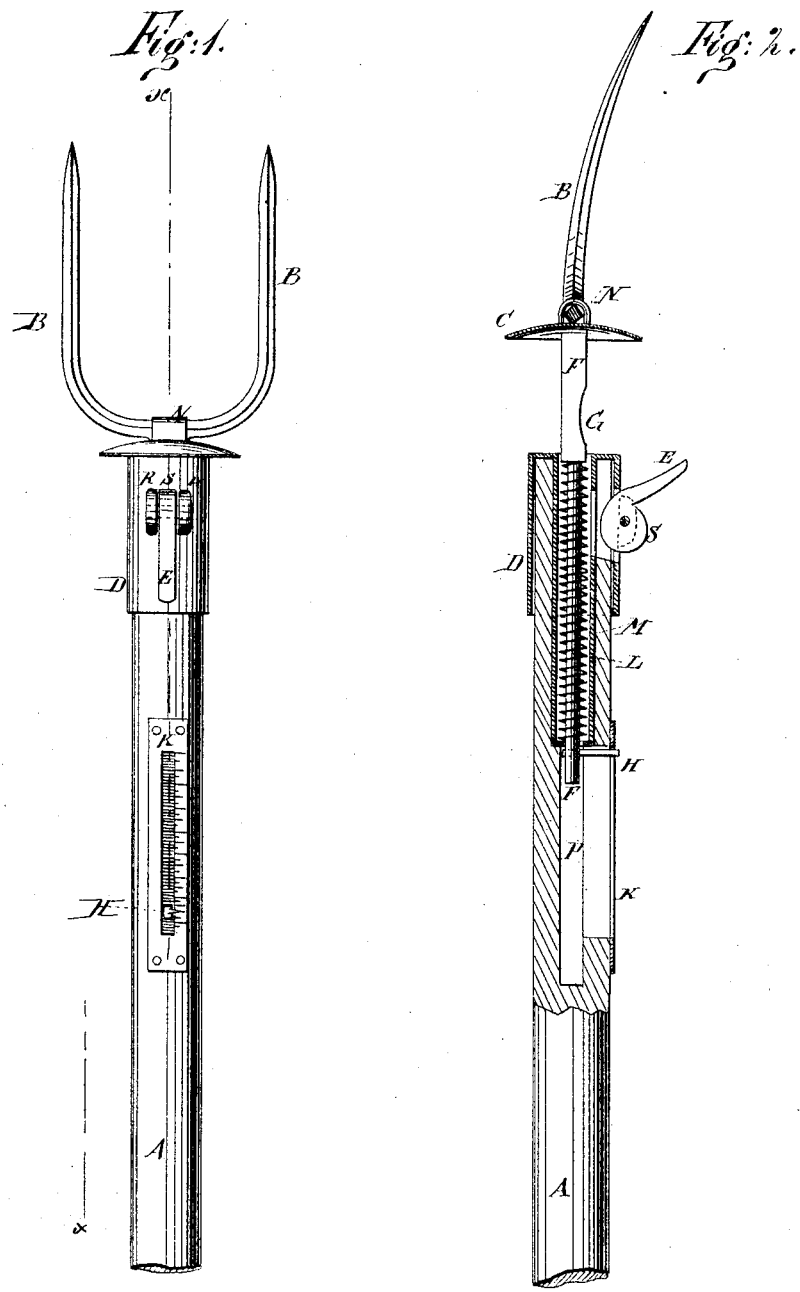

JOHN W. BLACKHART, OF WELLS' TANNERY, PENNSYLVANIA.

IMPROVEMENT IN HAY-FORKS.

Specification forming part of Letters Patent No. 219,902, dated September 23, 1879; application filed May 7, 1879.

*To all whom it may concern:*

Be it known that I, JOHN WESLEY BLACKHART, of Wells' Tannery, in the county of Fulton and State of Pennsylvania, have invented a new and Improved Hay-Fork, of which the following is a specification.

The object of my invention is to provide a fork for hay and like material furnished with a weighing apparatus, by means of which each fork-load can be weighed as it is handled.

The invention consists in the arrangement of a fork for hay or like material, to the shank of which a pointer is fixed which indicates the weight of the fork-load on a scale on the handle of the fork.

It also consists in the arrangement of an eccentric for holding the fork when it is not to be used for weighing purposes.

In the drawings, Figure 1 is a front view. Fig. 2 is a vertical longitudinal section on the line $x\ x$.

Similar letters of reference indicate corresponding parts.

A is the handle of the fork, hollowed out, as shown, to receive the tube M, which contains the spring L, and also so as to form the space P, into which the shank of the fork rests when the same is depressed.

D is a ferrule, which serves to strengthen the end of the handle, and to which the tube M is fastened. The ferrule is provided with jaws R R, between which the eccentric S, provided with a lever, E, is pivoted. The eccentric passes through slots in the ferrule and in the tube, and, by fitting into the recess G on the shank F, holds the fork in the desired position.

H is a pointer, fastened at or near the end of the shank F, and indicates the weight on a graduated scale, K.

B B are the prongs of the fork, of which there may be two, three, or four. To the same the disk C is fastened by means of the clasp N. This disk is to prevent the hay from falling on the eccentric, the pointer, or scale.

The shank of the fork may be round or square, and may extend down the handle any desired distance.

The operation is as follows: The shank is depressed and held by the eccentric, as shown in Fig. 1. A quantity of hay is taken onto the fork, and the eccentric raised, as shown in Fig. 2. The hay will depress the spring and the fork in proportion to its weight, and how great this weight is will be shown on the scale K by the pointer H.

It is not necessary to depress the shank and secure the same by the eccentric every time a fresh load is taken onto the same; but every time a load is taken the weight can be read off from the scale, and thus any quantity of hay can be weighed without any great expense or inconvenience.

If it is desired not to weigh with the fork, it is depressed and secured by the eccentric, as shown in Fig. 1, and can now be used like any other hay-fork.

By using my improved hay-fork all the inconvenience of baling and bundling hay, and transporting the same to the scales, is avoided, and any quantity of hay can be weighed at any desired place.

The tube M may be lengthened, and the lower end of the spring L secured to the lower end of the shank F, and the upper end secured to the tube. The spring will then be drawn out instead of depressed when weighing.

Having thus described my invention, I claim as new and desire to secure by Letters Patent—

The handle A, having scale K, ferrule with jaws R, spring L, and cam-lever E S, in combination with a fork having the disk C, and a grooved shank, F G, having the pointer H, as shown and described.

JOHN WESLEY BLACKHART.

Witnesses:
HARVEY WISHART,
W. L. PIPER.